United States Patent [19]

Nakayama et al.

[11] Patent Number: 5,602,681
[45] Date of Patent: Feb. 11, 1997

[54] LENS BARREL FOR A VIDEO CAMERA, AND LINEAR FEEDING SYSTEM THEREOF

[75] Inventors: Akihito Nakayama; Satoshi Sakamoto, both of Tokyo; Eiji Ohshima, Kanagawa; Kazuhiro Tanaka, Chiba; Shuji Moro, Tokyo, all of Japan

[73] Assignee: Sony Corporation, Tokyo, Japan

[21] Appl. No.: 418,687

[22] Filed: Apr. 7, 1995

[30] Foreign Application Priority Data

Apr. 11, 1994 [JP] Japan ................................ 6-096971

[51] Int. Cl.⁶ ............................. G02B 15/14; G02B 7/02; G01B 7/14; G01B 7/30
[52] U.S. Cl. ..................... 359/698; 359/697; 359/696; 359/824; 324/207.21
[58] Field of Search ....................... 359/698, 696, 359/697, 814, 824; 338/32 R; 324/207.21

[56] References Cited

U.S. PATENT DOCUMENTS

| | | | |
|---|---|---|---|
| 4,656,377 | 4/1987 | Akiyama | 310/68 R |
| 4,677,377 | 6/1987 | Takahashi | 324/208 |
| 4,818,939 | 4/1989 | Takahashi | 324/208 |
| 4,851,771 | 7/1989 | Ikeda | 324/208 |
| 4,866,382 | 9/1989 | Carmen | 324/208 |
| 4,914,389 | 4/1990 | Jews | 324/207.21 |
| 5,041,785 | 8/1991 | Bogaerts | 324/207.24 |
| 5,208,535 | 5/1993 | Nakayama | 324/218 |
| 5,430,375 | 7/1995 | Inoue | 324/207.21 |

*Primary Examiner*—Nabil Z. Hindi
*Assistant Examiner*—Ricky Mack
*Attorney, Agent, or Firm*—Jay H. Maioli

[57] ABSTRACT

A linear feeding system comprises a DC motor with brush, a lead screw integrally arranged as the rotational shaft of the DC motor, and a nut member screwed on the lead screw. This linear feeding system further comprises a magnet installed on the rotational shaft of the DC motor, which is provided with a plurality of N-pole and S-pole magnets being magnetized alternately in the circumferential direction, and a magnetoresistive effect sensor fixedly arranged to face this magnet. With this structure, it is possible to provide a simply structured, small linear feeding system capable of performing a high precision high-speed feeding operation at low costs.

4 Claims, 14 Drawing Sheets

5,602,681

LENS BARREL FOR A VIDEO CAMERA, AND LINEAR FEEDING SYSTEM THEREOF

BACKGROUND OF THE INVENTION

1. Field of the Invention

The present invention relates to a lens barrel for a video camera, and a linear feeding system used therefor. More particularly, the invention relates to a lens barrel for a video camera, and a linear feeding system used for a zoom lens feeding mechanism or the like for a lens barrel of a video camera, for example.

2. Related Background Art

Conventionally, a linear feeding system of the kind has used a DC motor with brush or a stepping motor as a source of its driving force, for example.

Among the linear feeding systems described above, there has been the system wherein an optical encoder is coupled outside its driving source in order to control the rotation of the driving source in a high precision.

However, with respect to this type of linear feeding system, the following problem has been encountered:

For a DC motor with brush adopted as described above as a driving source, a system should be prepared to reduce its rotational speed by use of gears while the DC motor is kept revolving at a high speed.

In this system, backlash is caused by the gears thus used so that the feeding accuracy is lowered inevitably. At the same time, noises deriving from the gears are comparatively great, among other problems.

Also, when a DC motor is used as a driving source for a system wherein the motor is controlled by means of an optical encoder, another problem is encountered that the encoder should be installed externally, making it necessary to arrange its coupling section highly accurately, leading to the increased costs of parts and assembling.

Further, there is a problem that the torque of a small DC motor is not good enough to allow an external encoder to be coupled directly for driving the motor.

Meanwhile, if a stepping motor is used as a source of driving force, there is also encountered a problem, among others, that the accuracy of stop positions is degraded because its driving control is an open loop. Moreover, the adoption of a stepping motor makes it difficult to sense the loss of synchronism, resulting in a defective performance in some cases. Particularly when micro steps are performed by use of a stepping motor, the position of a part to be driven cannot be known during the entire period of one step, hence making the execution of exact positioning difficult.

SUMMARY OF THE INVENTION

With a view to solving the problems described above, it is an object of the present invention to provide a lens barrel for a video camera, and a linear feeding system therefor capable of performing a highly precise feeding with a simple and small structure which can be fabricated at lower costs.

In order to achieve the object according to the present invention, a linear feeding system, including a driving source, a lead screw formed integrally with the rotational shaft of the driving source, and a nut member screwed on the lead screw, is arranged to further comprise a magnet installed on the rotational shaft of the driving source, having its N-pole and S-pole alternately magnetized in the circumferential direction, and a magnetoresistive effective sensor fixedly arranged facing the magnet.

With the structure described above, the magnetic fields of the N-pole and S-pole are alternately magnetized in the circumference of a cylindrical, column, or disc type magnet installed on the rotational shaft of the driving source. When these fields are caused to act upon the magnetoresistive effect sensor arranged to face the magnet, it becomes possible to detect the rotational direction and speed of the driving source.

In this way, a highly precise positional detection can be executed in accordance with the pitches of each magnetic pole of the magnet.

BRIEF DESCRIPTION OF THE DRAWINGS

The above-mentioned object, features and advantages of the present invention will become more apparent by reference to the following detailed description of the invention taken in conjunction with the accompanying drawings, in which.

DETAILED DESCRIPTION OF THE PREFERRED EMBODIMENTS

Hereinafter, with reference to FIGS. 1 to 24, the detailed description will be made of preferred embodiments in accordance with the present invention.

In this respect, the following embodiments are preferred specific examples of the present invention. Therefore, the description will be made with the various confinements which are technically desirable. However, the scope of the present invention is not limited to those embodiments.

Figure 1:
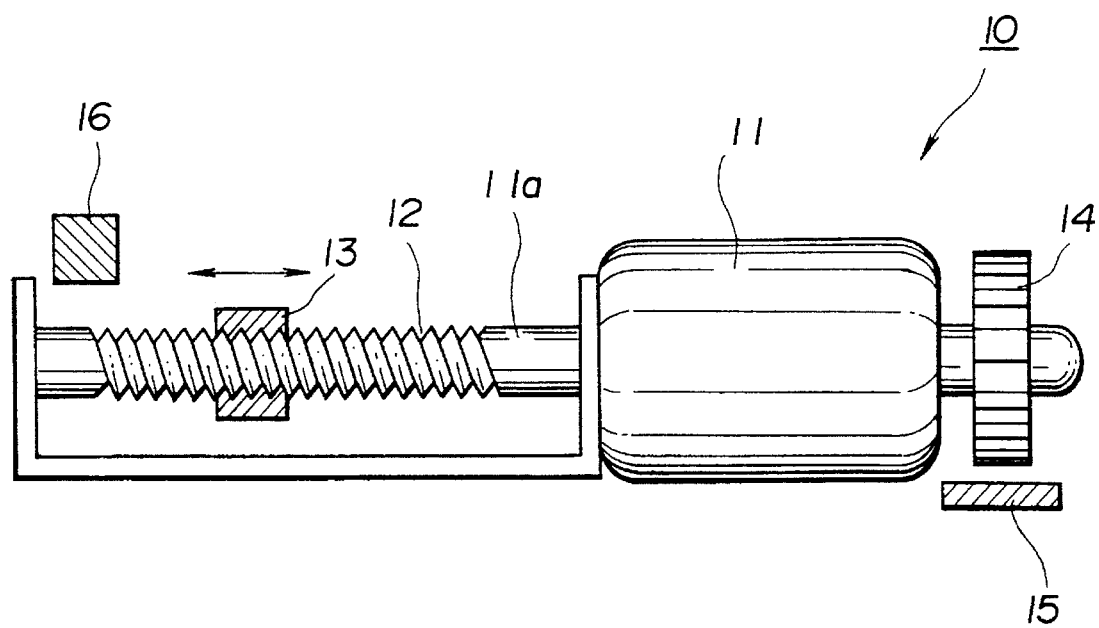
FIG. 1 is a side view which shows one embodiment of a linear feeding system in accordance with the present invention.

FIG. 1 is a view showing one embodiment of a linear feeding system in accordance with the present invention.

In FIG. 1, a linear feeding system 10 is provided with a DC motor 11 with brush; a lead screw 12 which is arranged together with the rotational shaft 11a of the DC motor 11; a nut member 13 screwed on the lead screw 12; a magnet 14 installed on the rotational shaft 11a of the DC motor having the N-pole and S-pole which are alternately magnetized in the circumferential direction; a magnetoresistive effect sensor 15 for angular detection, which is fixedly arranged to face this magnet 14; add an end point sensor 16 for detecting whether or not the nut member 13 arrives at the left end of the lead screw 12 in FIG. 1. In the present embodiment, the output of the end point sensor 16 is trailed when the nut member 13 abuts upon the end point sensor 16.

The DC motor 11 with brush is of a known structure. It is arranged to drive and rotate the rotational shaft 11a when a DC current is supplied from the outside.

The lead screw 12 is formed by threading the rotational shaft 11a directly in FIG. 1, but it may be possible to install a lead screw on the rotational shaft 11a by press fit, screw fit, or the like.

The nut member 13 is screwed on the lead screw 12 so that it can travel straight by the rotation of the lead screw 12 in the directions indicated by arrows. At the same time, the nut member is coupled to the part to be driven (not shown). In this way, along the linear traveling of the nut member 13 in the directions indicated by the arrows, the part to be driven is also allowed to travel in the directions indicated by the arrows. Here, the part to be driven is a supporting frame of a lens barrel for a video camera, a frame for supporting a focusing lens, or a supporting member of an optical pickup, for example.

Figure 2:
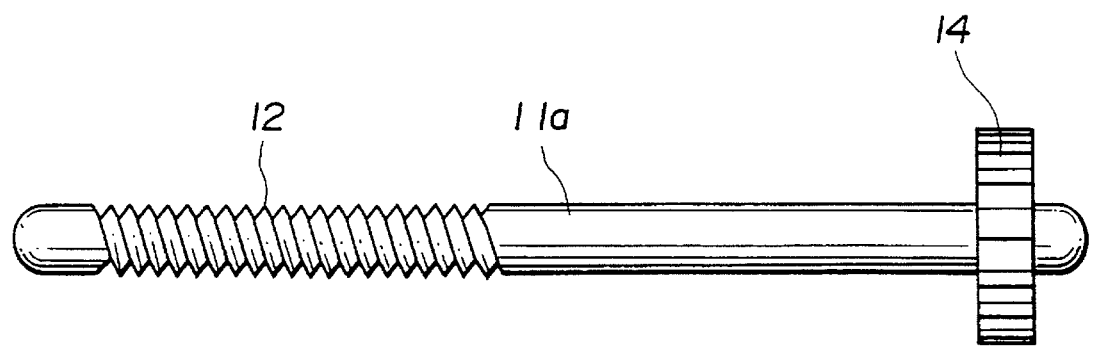
FIG. 2 is a side view which shows the rotational shaft and magnet of the linear feeding system represented in FIG. 1.

The magnet 14 is a magnet which is coaxially installed on the rotational shaft 11a of the DC motor 11 as shown in FIG. 2. The magnet is integrally formed by an injection molding, for example.

In FIG. 1, the magnet 14 is a disc type, but it may be a cylindrical or column type. It is usable in other embodiments if only the magnet is magnetizable in multiple polarities in the circumferential direction.

Figure 3:
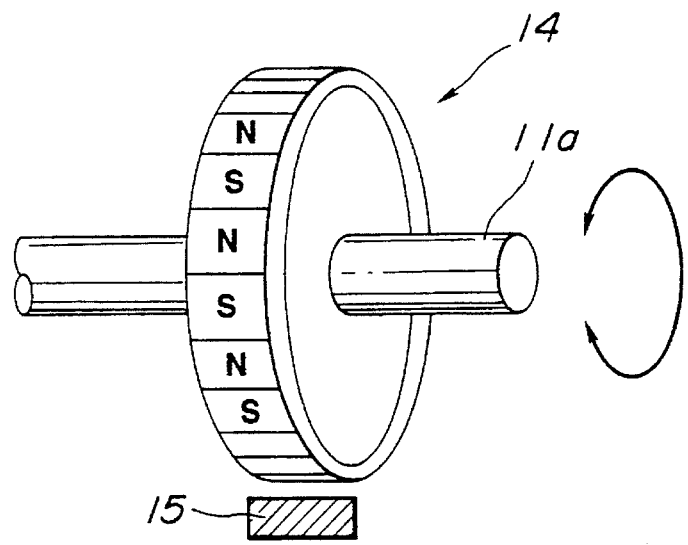
FIG. 3 is a partially enlarged Perspective view which shows the relationship between the magnet and magnetoresistive effect sensor in the linear feeding system represented in FIG. 1.

Further, the N-pole and S-pole of the magnet 14 is alternately magnetized in the circumferential direction as shown in FIG. 3.

The magnetoresistive effect sensor 15 is fixedly arranged to face the outer circumferential surface of the magnet 14 outside the radial direction of the magnet 14. Here, the magnetoresistive effect sensor 15 is a so-called ferromagnetic thin film element. This sensor is to measure the changes of magnetic field by utilizing the changes of resistance value of a thin film of ferromagnetic element such as Ni, Fe, CoNi, or the like, the changes being caused to take place when the magnetic field acts upon it. This element is generally used for detecting the angular velocity of a VTR capstan motor, for example.

Now, the description will be made of the operational principle of the magnetoresistive effect sensor 15.

Figure 4:
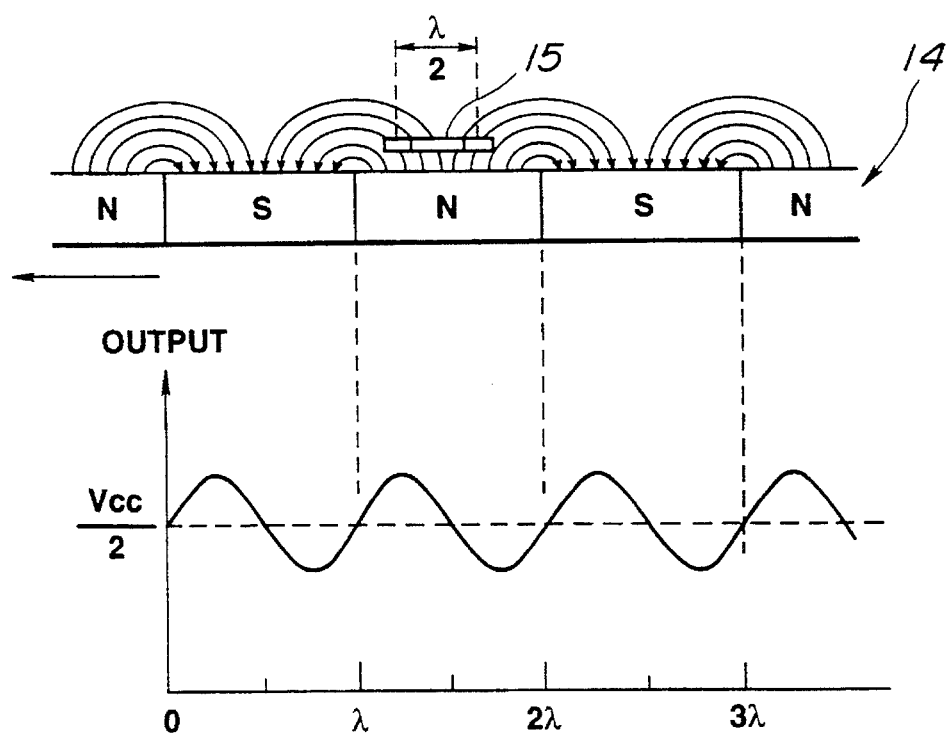
FIG. 4 is a view which schematically shows the relationship between the outputs of each pole of the magnet and the magnetoresistive effect sensor.

As shown on the upper part of FIG. 4, the magnetoresistive effect sensor 15 is structured to face the magnet having its N-pole and S-pole alternately arranged in a pole width of $\lambda$ so as to form a pattern in a width of $\lambda/2$.

Figure 6:
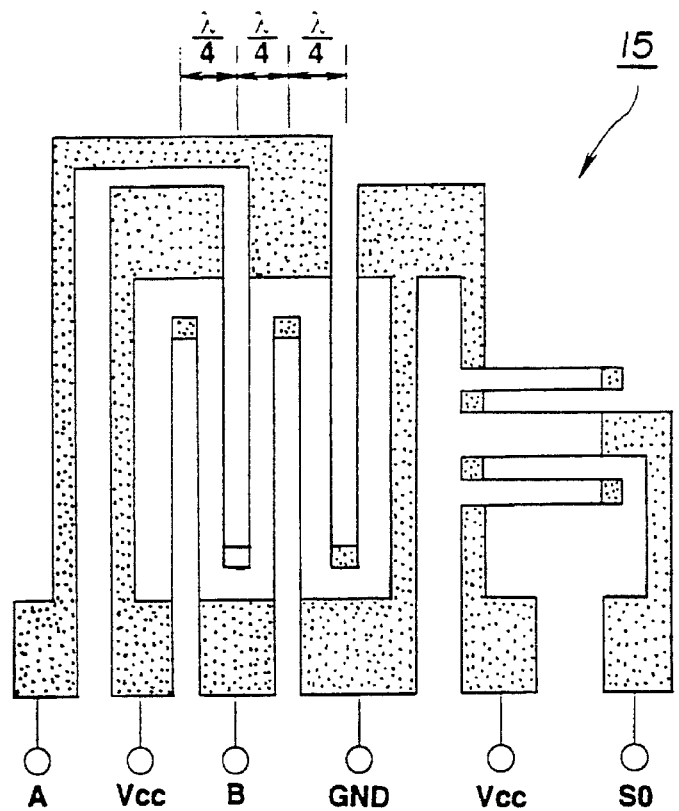
FIG. 6 is an enlarged plan view which shows the structure of the pattern of the magnetoresistive effect sensor of the linear feeding system represented in FIG. 1.

To both ends of this pattern, a constant voltage Vcc and earth GND are connected, respectively, and then, the midpoint potential Vs of the pattern is drawn from the taps A and B as output (see FIG. 6).

As shown on the lower part of FIG. 4, it is arranged that when the magnet 14 is caused to shift in the direction indicated by an arrow, a sine wave or pseudo-sine wave of one cycle is obtainable from the magnetoresistive effect sensor 15 as its midpoint potential Vs with respect to the one pole width of $\lambda$ centering on the Vcc/2 in accordance with its correlative position to the magnet 14.

Figure 5A:
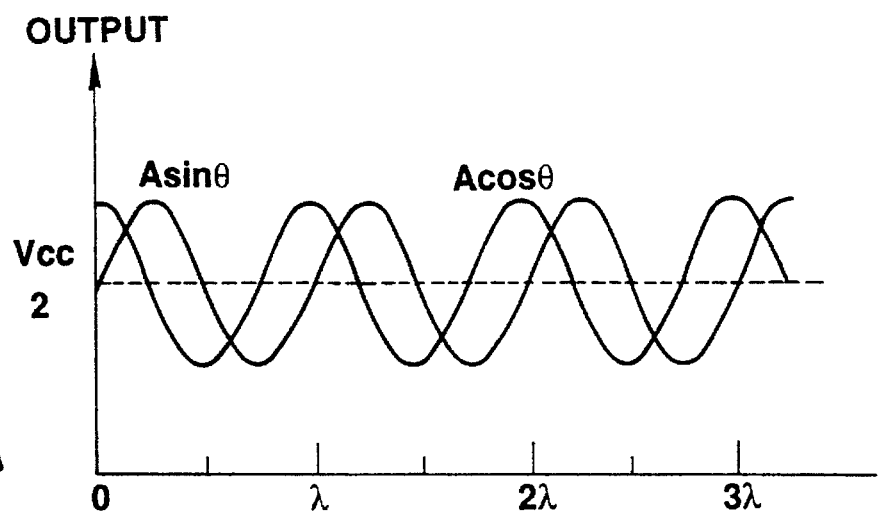
FIGS. 5A–5C are graphs which show respectively each output of the magnetoresistive effect sensor of the linear feeding system represented in FIG. 1.

When the magnetoresistive effect sensor 15 is provided with two patterns in the positions which are displaced from each other by λ/4, the output of each pattern of the magnetoresistive effect sensor 15 is caused to present a sine wave and a cosine wave, respectively, centering on the Vcc/2 as shown in FIG. 5A. These can be expressed by the following formulas (1) and (2):

$$A \cdot \sin \theta + Vcc/2 \quad (1)$$

$$A \cdot \cos \theta + Vcc/2 \quad (2)$$

In this case, the magnetoresistive effect sensor 15 is structured as represented in FIG. 6.

In FIG. 6, the patterns of the magnetoresistive effect sensor 15 on the Vcc side and GND side are apart from each other by λ/2 with respect to one pole width of λ, and at the same time, the adjacent two patterns are apart from each other by λ/4.

Figure 7:
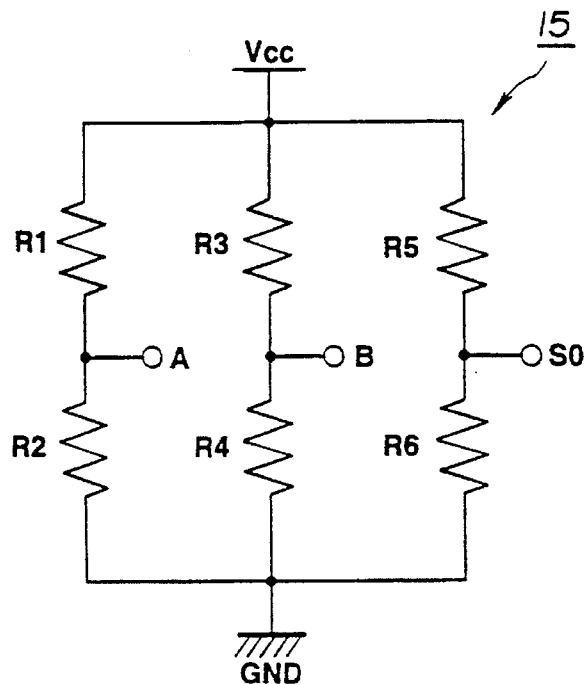
FIG. 7 is a diagram which shows the equivalent circuit of the magnetoresistive effect sensor represented in FIG. 6.

With the provision of these patterns, it is possible to arrange an equivalent circuit for the magnetoresistive effect sensor 15 as shown in FIG. 7. Of the resistors, the R1 and R2, R3 and R4, and R5 and R6 are provided with the same resistance values, respectively.

Of these resistors, the resistance values of the R1 and R2, and R3 and R4 are caused to change when the intensity of acting magnetic field changes by the positions of the magnet 14 shown in FIG. 4. As a result, the outputs from the output taps A and B become Asinθ and Acosθ centering on Vcc/2 in accordance with the positions of the magnet 14, respectively, as shown in FIG. 5A.

On the other hand, the resistors R5 and R6 are arranged in a position where no effect is exerted by the magnetic field. Therefore, the output tap SO can output a constant voltage of Vcc/2 at all times irrespective of the positions of the magnet 14.

Figure 8:
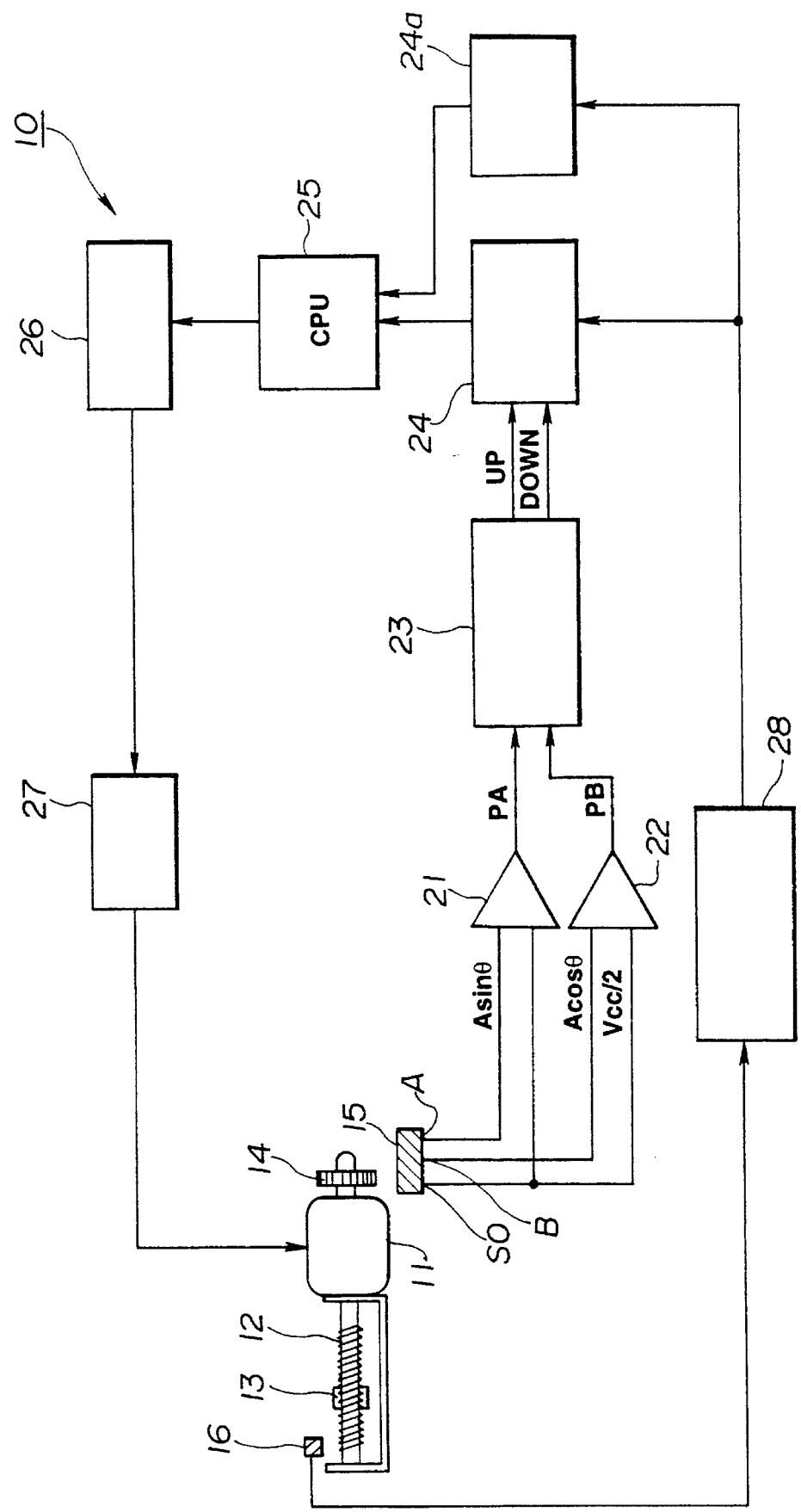
FIG. 8 is a block diagram which shows the electrical structure of the linear feeding system represented in FIG. 6.

FIG. 8 shows the electrical structure of the linear feeding system represented in FIG. 1.

In FIG. 8, the linear feeding system 10 comprises a first comparator 21 having the inverted input and non-inverted input to which the output taps A and SO of the magnetoresistive effect sensor 15 are connected, respectively; a second comparator 22 having the inverted input and non-inverted input to which the output taps B and SO of the magnetoresistive effect sensor 15 are connected, respectively; a phase discriminator 23 to which each output of the comparators 21 and 22 are inputted; a trailing detector 28 to which the output signals from the end point sensor 16 are inputted; an up-down counter 24 to which the signals from the phase discriminator 23 and the trailing detector 28 are inputted; and a latch 24a to which the signals from the trailing detector 28 is incurred.

Then, it is arranged that the signals from the up-down counter 24 and latch 24a are inputted to a CPU 25. A driver 27 is controlled by the CPU 25 through a D/A converter 26.

By the application of the rotational direction and speed of the magnet 14, the magnetoresistive effect sensor 15 senses the traveling direction and speed of the nut member 13 which is determined by the rotational direction and speed of the rotational shaft 11a.

Figure 5B:
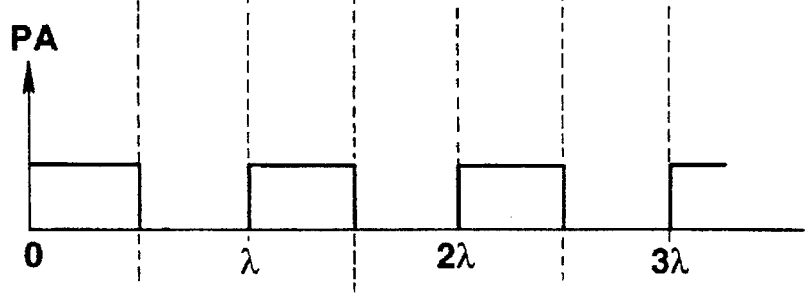
Figure 5C:
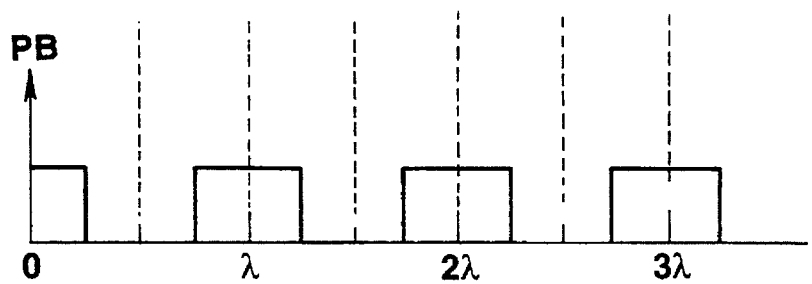

The comparators 21 and 22 compare the Asinθ and Acosθ of the output taps A and B of the MR sensor 15, and the Vcc/2 of the output tap SO, respectively, and output digital signals PA and PB shown in FIGS. 5B and 5C, respectively.

The phase discriminator 23 detects the rotational direction of the rotational shaft 11a and signal edges in accordance with the digital signals from the comparators 21 and 22. If the signals are generated in one direction, up pulses are output to the up-down counter 24. If the signals are in the other direction, down pulses are output to it. In this case, the up pulses are in synchronism with the digital signals PA or PB, for example.

The up-down counter 24 detects the angles of the rotational shaft 11a of the DC motor 11 by counting the up pulses or down pulses from the phase discriminator 23.

The CPU 25 calculates the angular information (current value) of the rotational shaft 11a in accordance with the counted value output from the up-down counter 24. From the difference between the angular information thus obtained and the angle (target value) of the rotational shaft 11a for the desired traveling position of a part to be driven, the CPU provides a driving instruction value.

Figure 9:
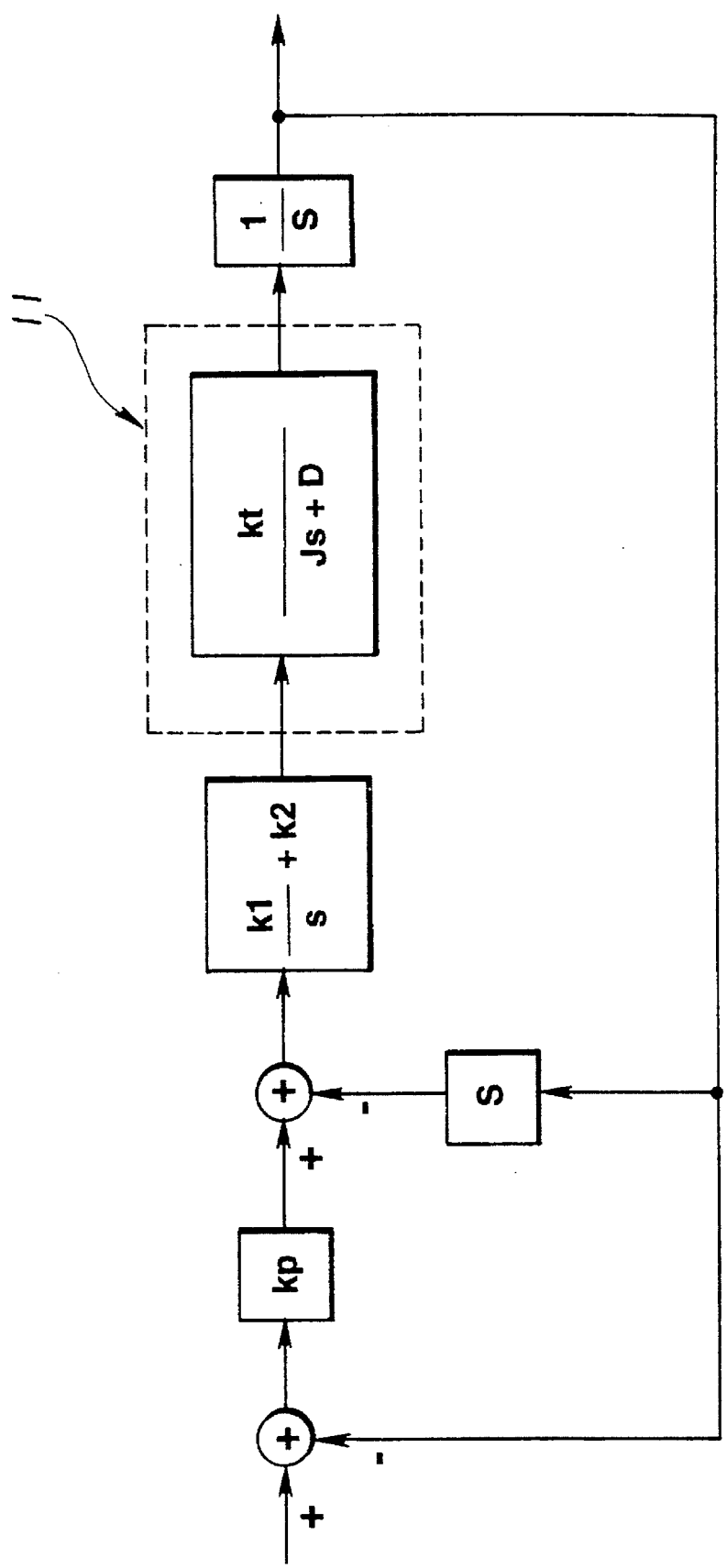
FIG. 9 is a block diagram which shows the control in accordance with the counted value of a counter represented in FIG. 8.

In this case, the CPU 25 compares the desired traveling position (target value) of a part to be driven and the current position (current value) in the outer positional loop in accordance with the counted value of the up-down counter 24 as shown in FIG. 9, and executes the comparative control by multiplying this difference by a gain kp of the positional proportion.

Also, it is arranged that the CPU 25 obtains a speed from the differential information of a counted value in the inner velocity loop, and compares the velocity information and the result of the positional loop, thus executing the proportion-differential control with respect to the difference obtainable by the comparison.

In this way, the CPU 25 converts the result of the proportional control and the proportion-differential control to analogue signals by use of the D/A converter 26, and outputs them to the driver 27. Thus the driver 27 stores the analogue signals in the buffer, and supplies current to the motor Then, in FIG. 9, a calculation is executed with a formula (3) given below, where the positional proportion gain is kp; the velocity differential gain is k1: the velocity proportion gain is k2; the Laplace's operator is s; the motor torque constant is kt; the motor inertia is j; and the viscosity term is D.

$$K1/s+K2 \quad (3)$$

Hence in the DC motor 11 controlled by the driver 27 for its driving can be:

$$Kt/(Js+D) \quad (4)$$

Thus the counted value after shifting is obtainable by the following:

$$1/s \quad (5)$$

The trailing detector 28 outputs a signal when detecting the trailing output of the end point sensor 16. By this output, the counted value of the up-down counter 24 is cleared to give it its absolute position. Further, it is arranged that the CPU 25 is initialized by means of the latch 24a.

The linear feeding system 10 of the present embodiment is structured as described above, and the DC motor 11 rotates by the driving control of the driver 27 through the D/A converter 26.

In this way, the rotational shaft 11a is caused to rotate so that the nut member 13 screwed on the lead screw 12 of the rotational shaft 11a is allowed to travel in the axial direction of the rotational shaft 11a.

Figure 10:
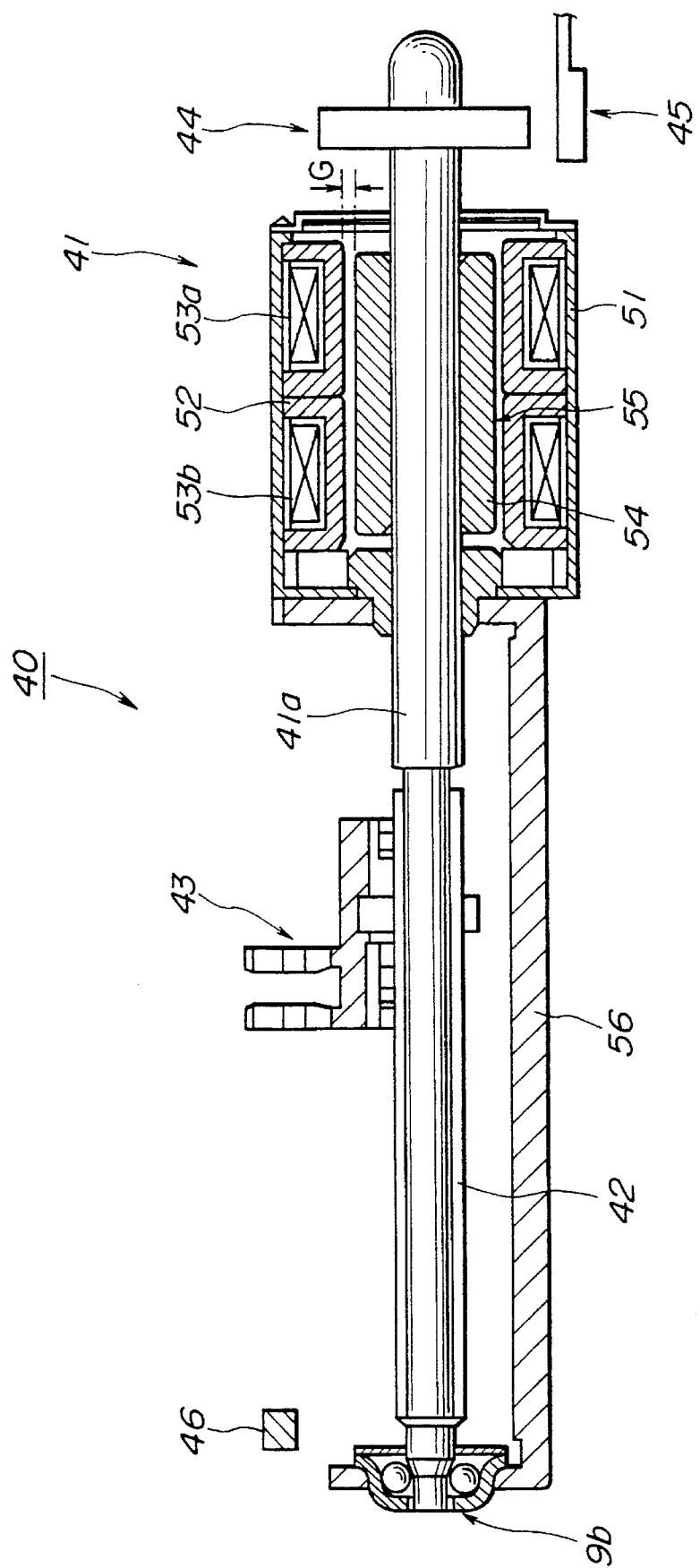
FIG. 10 is a side view which shows another embodiment of a linear feeding system in accordance with the present invention.

FIG. 10 shows a second embodiment of the linear feeding system in accordance with the present invention.

In FIG. 10, a linear feeding system 40 comprises a stepping motor 41 serving as the source of its driving force; a lead screw 42 integrally provided for the rotational shaft 41a of the stepping motor 41; a nut member 43 screwed on the lead screw 42; a magnet 44 installed on the rotational shaft 41a of the stepping motor 41, having its N-pole and S-pole being magnetized alternately in the circumferential direction; a magnetoresistive effect sensor 45 fixedly arranged to face the magnet 44 for detecting angles; and an end point sensor 46 arranged in the vicinity of the end portion of the lead screw 42 on the side opposite to the stepping motor 41 for detecting whether or not the nut member 43 arrives at the left end section of the lead screw 42 in FIG. 10.

The stepping motor 41 is structured as follows:

In FIG. 10, the supporting frame 56 for the stepping motor 41 is extended in the axial direction of the rotational shaft of the motor. Its section in the axial direction is configured like a frame which is open upwardly as shown in FIG. 10. On one end section of the supporting frame 56, a casing element 51 is fixed.

In the casing element 51, a cylindrical yoke assembly (stator) 52 is housed. The yoke assembly 52 is formed by four sets of pole tooth yokes integrally molded by resin, for example. Then, on the yoke assembly 52, two coils 53a and 53b are formed, for example. The outer circumference thereof is covered by the casing element 51.

Further, in the interior of this casing element 52, there is arranged a rotor 55 formed by the magnet 54 installed on the rotational shaft 41a. Around the magnet 54, a given gap G is provided between the inner circumferential surface of the yoke assembly 52 and the magnet. Therefore, the rotational shaft 41a is caused to rotate by the application of the rotational field generated by the orderly changing currents running through the coils 53a and 53b.

The structure of the present embodiment is the same as that of the first embodiment with exception of the driving source 11 which is now a stepping motor. However, the stepping motor being controlled by an open loop, the D/A converter 26 used for the DC motor, the source of driving force, in the electrical structure shown in FIG. 8 becomes a predriver whereby to input the feed instructions from the CPU into the driver as microstep signals.

Now, with reference to FIG. 11 to FIG. 23 where the principal part of such variations are shown, the description will be made of the variations of the linear feeding system which utilizes a stepping motor as its source of driving force.

Figure 11:
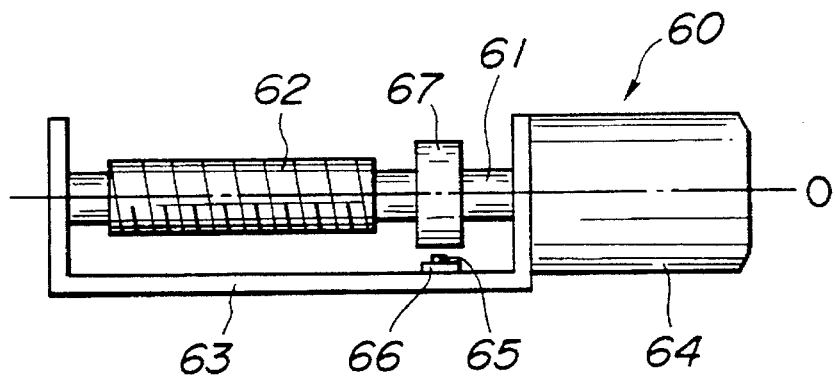
FIG. 11 is a view which schematically shows one example of the mounting structure for the magnet and magnetoresistive effect sensor of a linear feeding system according to a preferred embodiment of the present invention.

A linear feeding system 60 shown in FIG. 11 is of a such structure that a magnet 67 is installed on one end section of the rotational shaft 61 of a motor, which is extended to the inner side of a supporting frame 63. In this example shown in FIG. 11, the magnet 67 is arranged between the lead screw 62 and the motor case 64 inside the supporting frame 63.

A magnetoresistive effect sensor 65 is installed inside the supporting frame 63 through a mounting member 66, and also, fixed to a position facing the magnet 67.

In this way, it is possible to accurately position the center of the supporting frame 63 in the longitudinal direction and the axial center O of the rotational shaft 61 by use of moldings formed by synthetic resin if the supporting frame 63 is designed in advance appropriately.

Therefore, an appropriate gap can be provided between the magnetizing surface on the circumference of the magnet 67 and the magnetoresistive effect sensor 65 if only the magnetoresistive effect sensor 65 is fixed to the supporting frame 63 through a mounting member 66 which is adjusted to a given thickness as shown in FIG. 11.

In this way, it is possible to easily arrange the magnetoresistive effect sensor 65 in a position where it can produce an appropriate flux density in accordance with the magnetized condition of the magnet 67.

Figure 12:
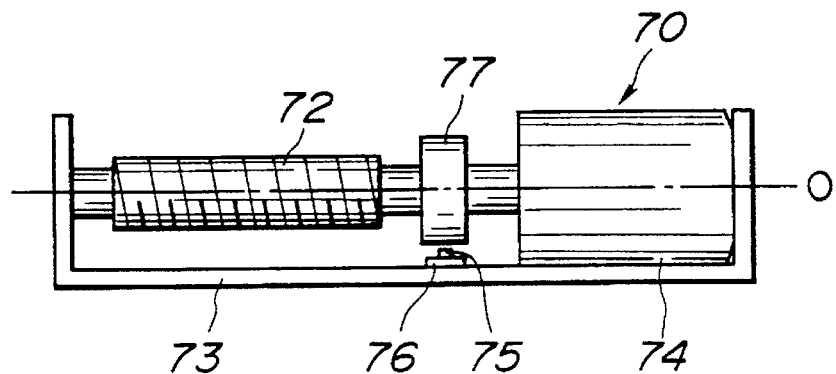
FIG. 12 is a view which schematically shows one example of the mounting structure for the magnet and magnetoresistive effect sensor of a linear feeding system according to a preferred embodiment of the present invention.

A linear feeding system 70 shown in FIG. 12 is of such a structure that a supporting frame 73 is formed in a larger size, and that the motor case 74 of a stepping motor is housed in this supporting frame 73. In the linear feeding system 70, too, a magneto-resistive effect sensor 75 is installed inside the supporting frame 73 through a mounting member 76.

Therefore, as in the case shown in FIG. 11, the magnetoresistive effect sensor 75 can be fixed with the supporting frame 73 as reference, making it possible to set the distance between the magnet 67 and the sensor appropriately.

Figure 13:
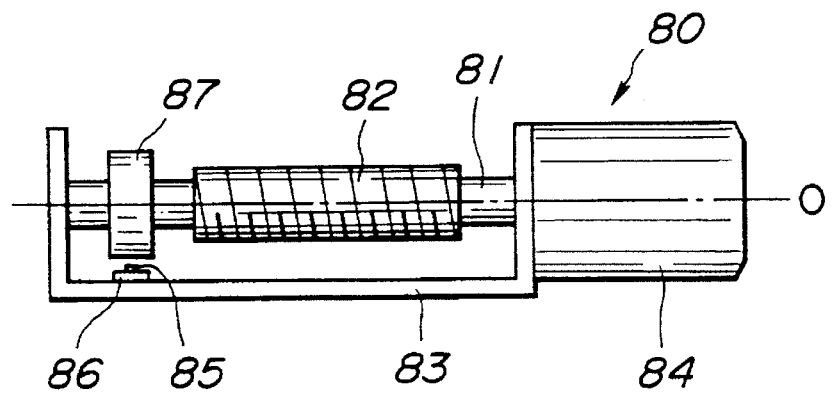
FIG. 13 is a view which schematically shows one example of the mounting structure for the magnet and magnetoresistive effect sensor of a linear feeding system according to a preferred embodiment of the present invention.

A linear feeding system 80 shown in FIG. 13 is such that a magnet 87 is inside a supporting frame 83, and fixed to the other end section of the rotational shaft 81 unlike the case shown in FIG. 11.

As a result, if only a position facing this magnet 87 is selected and a magnetoresistive effect sensor 85 is fixed inside the supporting frame 83 as shown in FIG. 13, it is possible to obtain the same effect as in the case shown in FIG. 11.

Now, for a linear feeding system of the kind, it is necessary to insert the rotational shaft into the motor case through the supporting frame from the left side in FIG. 13 when assembled. However, for the linear feeding systems shown in FIG. 11 to FIG. 13, each magnet is arranged to the left side of the motor case. Therefore, the magnet should be kept in the designated position while the rotational shaft is inserted into the supporting frame when the rotational shaft is assembled, and, further, it should be placed through the motor case after being inserted into the magnet to complete the assembling processes.

Figure 14:
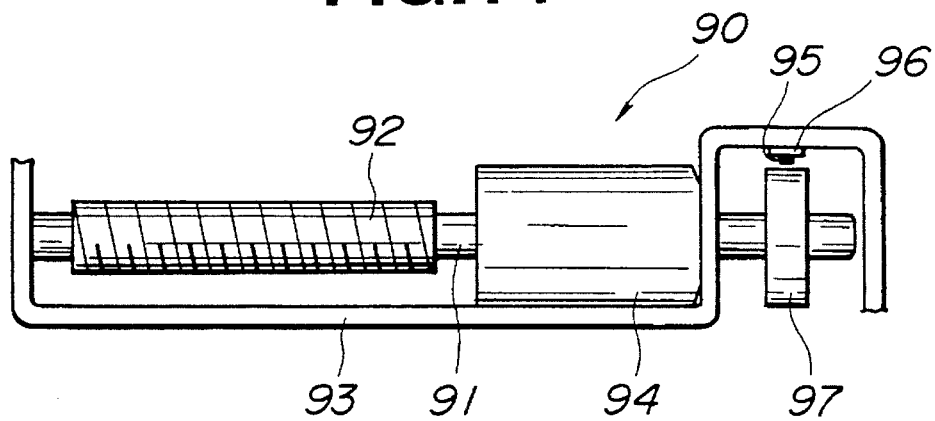
FIG. 14 is a view which schematically shows one example of the mounting structure for the magnet and magnetoresistive effect sensor of a linear feeding system according to a preferred embodiment of the present invention.
Figure 15:
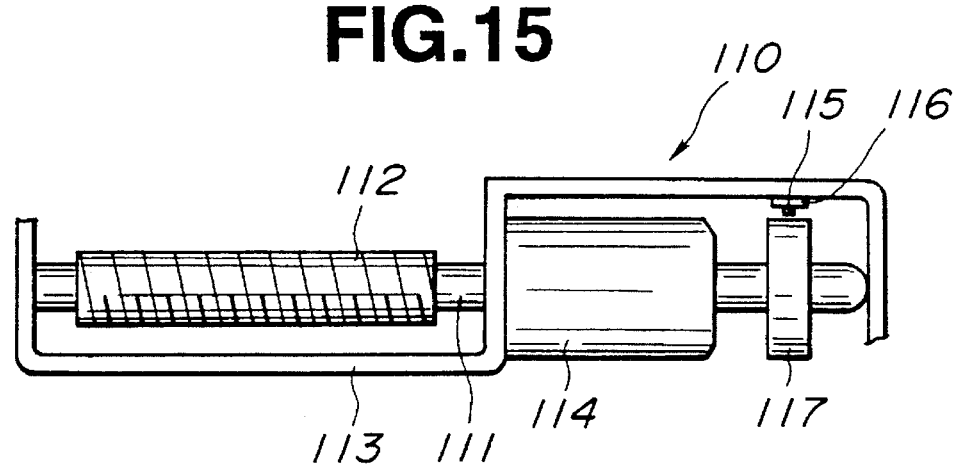
FIG. 15 is a view which schematically shows one example of the mounting structure for the magnet and magnetoresistive effect sensor of a linear feeding system according to a preferred embodiment of the present invention.

Here, in FIG. 14 and FIG. 15, each of the magnets 97 and 117 is arranged to be fitted and fixed to the leading end side of each rotational shaft 91 and 111. In this way, each of the rotational shafts 91 and 111 can be inserted through the supporting frame 93 and 113 and the motor case 94 and 114 in advance, and then, inserted through the magnet 97 and 117 lastly. This arrangement makes the assembling easier.

In this respect, the supporting frames 93 and 113 of the linear feeding systems shown in FIG. 14 and FIG. 15 are structured by folding its intermediate sections. For these linear feeding systems 90 and 110, the magnetoresistive effect sensors 95 and 115 are fixed on the supporting frames 93 and 113 where the magnets 97 and 117 are housed as shown in FIG. 14 and FIG. 15 as in the case of FIG. 11. Therefore, the same effect is obtainable as in the linear feeding system 60 shown in FIG. 11.

Figure 16:
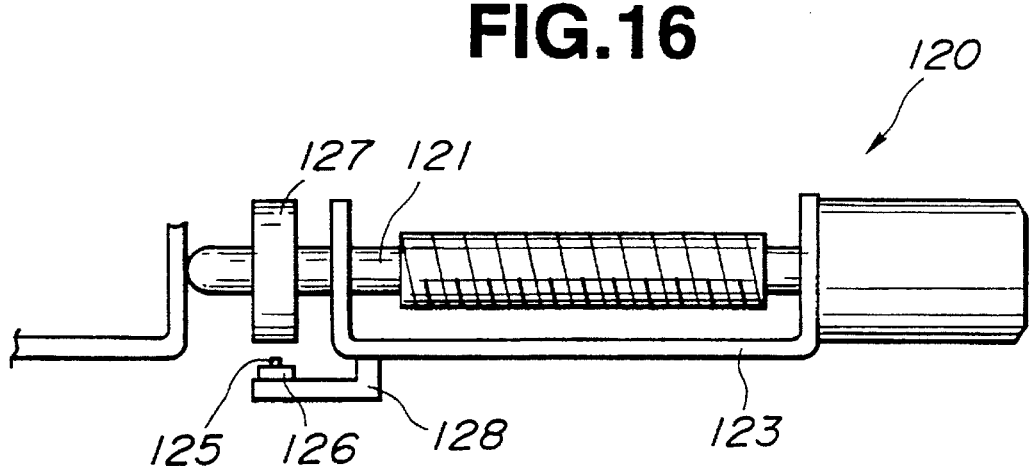
FIG. 16 is a view which schematically shows one example of the mounting structure for the magnet and magnetoresistive effect sensor of a linear feeding system according to a preferred embodiment of the present invention.

In FIG. 16, a magnet 127 is fixed to the left end side of the rotational shaft 121 of a linear feeding system 120. Therefore, as in the cases shown in FIG. 14 and FIG. 15, the assembling becomes easier. Also, for a linear feeding system 130 shown in FIG. 17, a magnet is fixed to the right end side of the rotational shaft 131. As a result, the same effect is obtainable as in the linear feeding system 120 shown in FIG. 16.

Here, in the case shown in FIG. 16, the magnetoresistive effect sensor 125 is fixed in such a manner that a fixing member 128 having a substantially angled section is arranged for the supporting frame 123, and a mounting member 126 is fixed to it, and then, the sensor is fixed through this mounting member 126.

Figure 17:
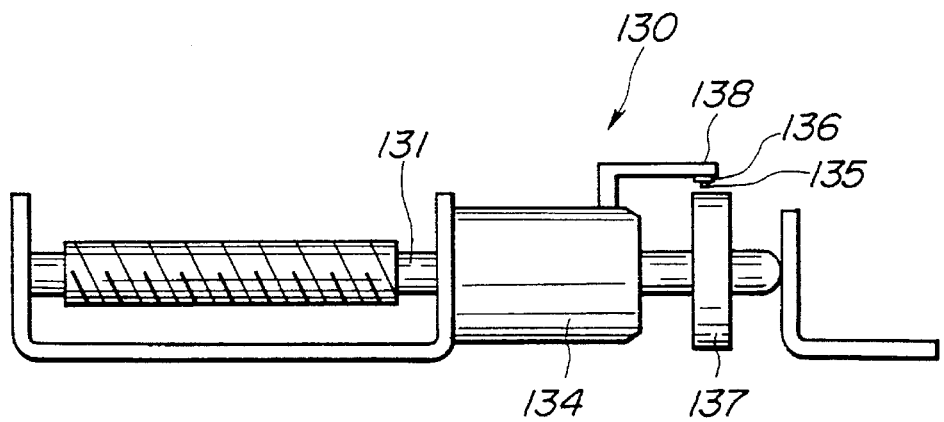
FIG. 17 is a view which schematically shows one example of the mounting structure for the magnet and magnetoresistive effect sensor of a linear feeding system according to a preferred embodiment of the present invention.

Also, in the case shown in FIG. 17, the magnetoresistive effect sensor 135 is fixed in such a manner that a fixing member 138 having a substantially L-letter shaped section is arranged for the motor case 134, and a mounting member 136 is fixed to it, and then, the sensor is fixed through this mounting member 136.

Figure 18:
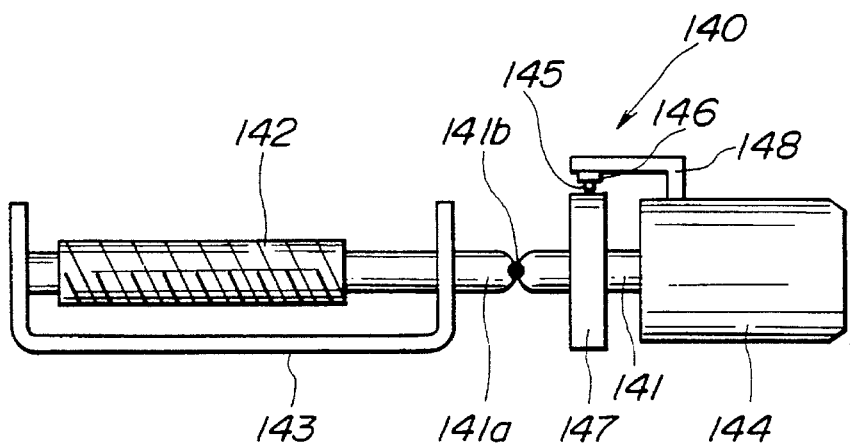
FIG. 18 is a view which schematically shows one example of the mounting structure for the magnet and magnetoresistive effect sensor of a linear feeding system according to a preferred embodiment of the present invention.

FIG. 18 shows still another variation of the linear feeding system.

In FIG. 18, the linear feeding system 140 is structured by arranging a supporting member 143, and a lead screw 142 side and a motor case 144 side separately, and then, the leading end of the rotational shaft 141 is coupled in a joint section 141b by welding or the like. In this way, it is possible to select a lead screw 142 having a different pitch appropriately, for example, and install it on the motor main body side. This arrangement also provides an excellent versatility.

Here, in this case, a magnetoresistive effect sensor 145 is fixed in such a manner that a mounting member 146 is arranged for a fixing member 148 fixed to the motor case 144, and then, the sensor is fixed to this mounting member 146.

Figure 19:
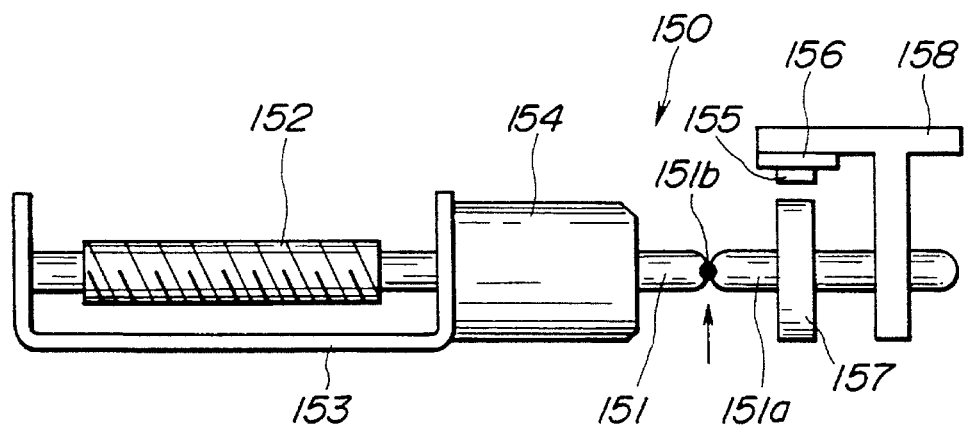
FIG. 19 is a view which schematically shows one example of the mounting structure for the magnet and magnetoresistive effect sensor of a linear feeding system according to a preferred embodiment of the present invention.

For a liner feeding system 150 shown in FIG. 19, a lead screw 152, a supporting frame 153, and a motor case 154 are arranged on the left side in FIG. 19. To the leading end of the rotational shaft 151, another rotational shaft 151a is connected to it through a joint section 151b. On this rotational shaft 151a, a magnet 157 is fixed. This rotational shaft 151a is inserted into a fixing member 158 which is an element arranged separately. On the lower face of this fixing member 158, a magnetoresistive effect sensor 155 is fixed to face the magnet 157 through a mounting member 156.

Consequently, for this linear feeding system 150, too, it is possible to appropriately combine another magnet and others having different sizes as in the case shown in FIG. 18. This arrangement also provides an excel, lent versatility.

In this respect, the rotational shafts of the linear feeding systems shown in FIG. 11 to FIG. 19 are partially threaded to make them lead screws. However, it may be possible to make them lead screws over its entire length.

Figure 20B:
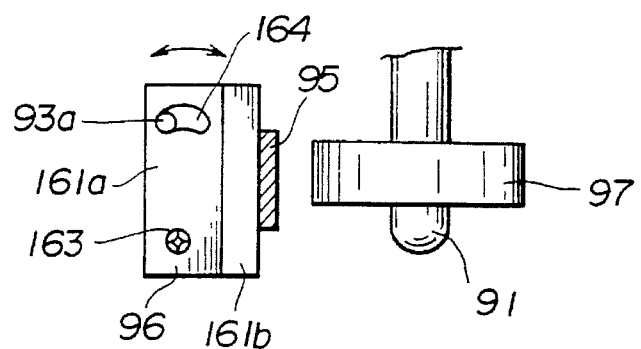
FIGS. 20A to 20C are views which schematically show one example of the gap adjustment structure for the magnet and magnetoresistive effect sensor of a linear feeding system according to a preferred embodiment of the present invention.
Figure 20A:
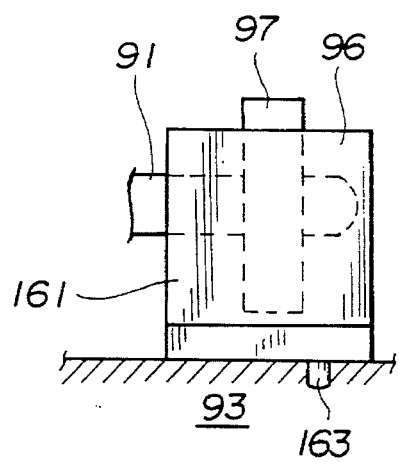
Figure 20C:
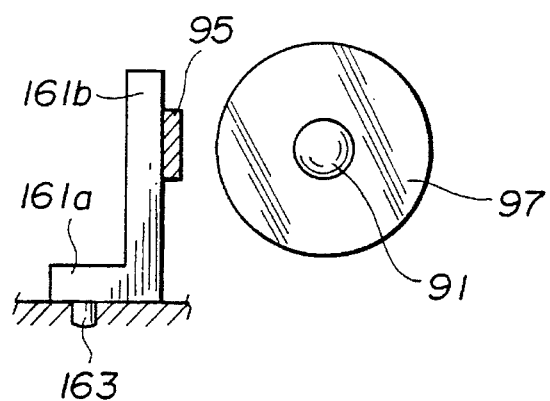

FIGS. 20A to 20C illustrate an example of the structure for adjusting the gap between a magnetoresistive effect sensor and a magnet.

FIG. 20A is a front view which shows its principal part. FIG. 20B is a bottom view thereof. FIG. 20C is a side view. This gap adjustment structure is suitably applicable to the mounting structure of the magnetoresistive effect sensor shown in FIG. 14, for example. FIG. 20A and FIG. 20C illustrate the elements in FIG. 14 upside down for the convenience of the description.

In FIG. 20A and FIG. 20C, the mounting member 161 comprises a horizontal section 161a fixed to the supporting frame 93, and a vertical section 161b extending vertically from one end of the horizontal section 161a. On the side face of the vertical section 161b on the magnet 97 side, the magnetoresistive effect sensor 95 is fixed. An extrusion 163 is formed on the bottom face of the horizontal section 161a, which is inserted into a mounting hole formed on the supporting frame 93 in advance. On the end portion of the horizontal section 161a on the side opposite to the extrusion 163, an elongated hole 164 configured substantially in the R-letter shape is arranged as shown in FIG. 20B. Then, an arrangement is made so that the extrusion 93a which is formed on the upper face of the supporting frame 93 is fitted into the elongated hole 164.

With this arrangement, it is possible to rotate the mounting member 96 around the extrusion 163 in the direction indicated by an arrow by shifting the extrusion 93a correlatively in the elongated hole 164. As a result, the magnetoresistive effect sensor 95 fixed to the mounting member 96 is allowed to approach the magnet 97 or part from it. Thus the gap between the magnetoresistive effect sensor 95 and the magnet 97 can be adjusted so that the horizontal section 161a of the mounting member 96 can be fixed to the supporting frame 93 by means of an adhesive bonding or the like after selecting the location where the flux density is appropriate.

Figure 21A:
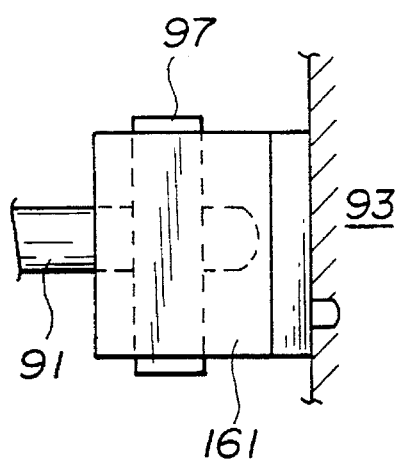
FIGS. 21A to 21C are integrally a view which schematically shows one example of the gap adjustment structure for the magnet and magnetoresistive effect sensor of a linear feeding system according to a preferred embodiment of the present invention.
Figure 21B:
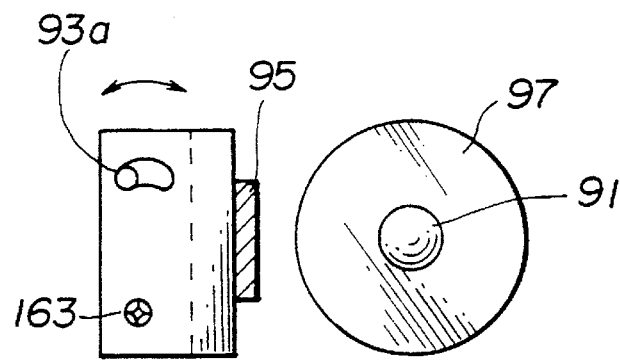
Figure 21C:
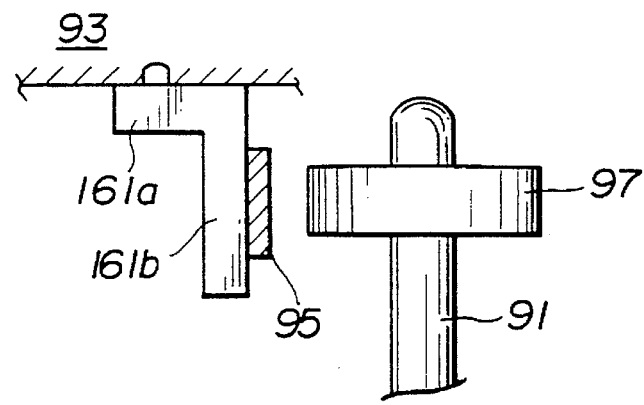

FIG. 21 shows another example of the adjustment structure for the gap between a magnetoresistive effect sensor and a magnet. In this example, the direction of the magnet 97 and the magnetoresistive effect sensor 95 differs from that of those shown in FIG. 21, but all the other structures are the same as those shown in FIG. 21.

Figure 22:
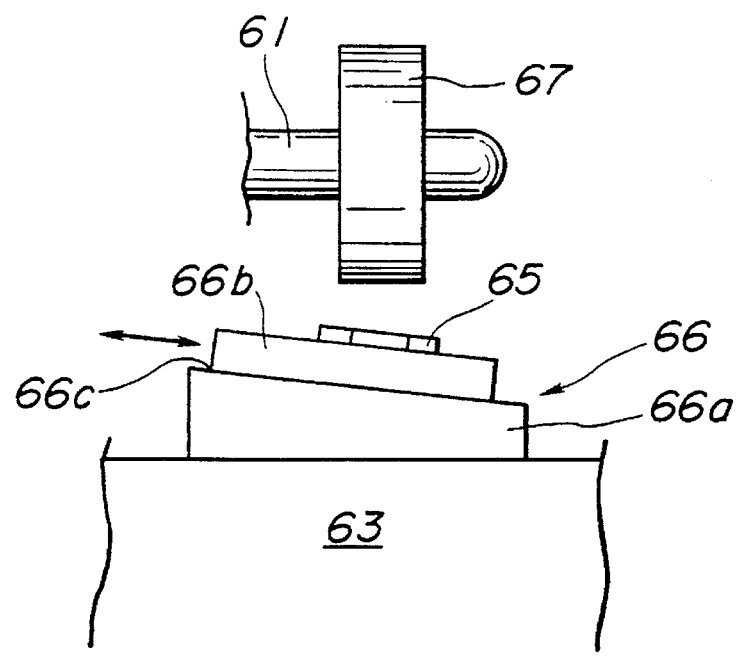
FIG. 22 is a view which schematically shows one example of the gap adjustment structure for the magnet and magnetoresistive effect sensor of a linear feeding system according to a preferred embodiment of the present invention.

FIG. 22 shows still another example of the adjustment structure for the gap between a magneto-resistive effect sensor and a magnet.

FIG. 22 represents the principal part when the supporting frame 63 shown in FIG. 11 is installed on the magnetoresistive effect sensor 65. A mounting member 66 comprises a first mounting member 66a and a second mounting member 66b, for example. The upper face of the first mounting member 66a is made an inclined surface 66c, and on this included surface 66c, the second mounting member 66b is installed. To this second mounting member 66b, the magnetoresistive effect sensor 65 is fixed.

When the second mounting member 66b is allowed to shift on the inclined surface 66c in the direction indicated by arrows, the gap between the magneto-resistive effect sensor 65 and the magnet 67 is made closer or wider accordingly. In this way, the magneto-resistive effect sensor 65 facing the magnet 67 can be placed in a position where the flux density of the magnet 67 is appropriate, hence enabling the second mounting member 66b to be fixed to the first mounting member 66a by means of adhesive bonding or the like.

Figure 23:
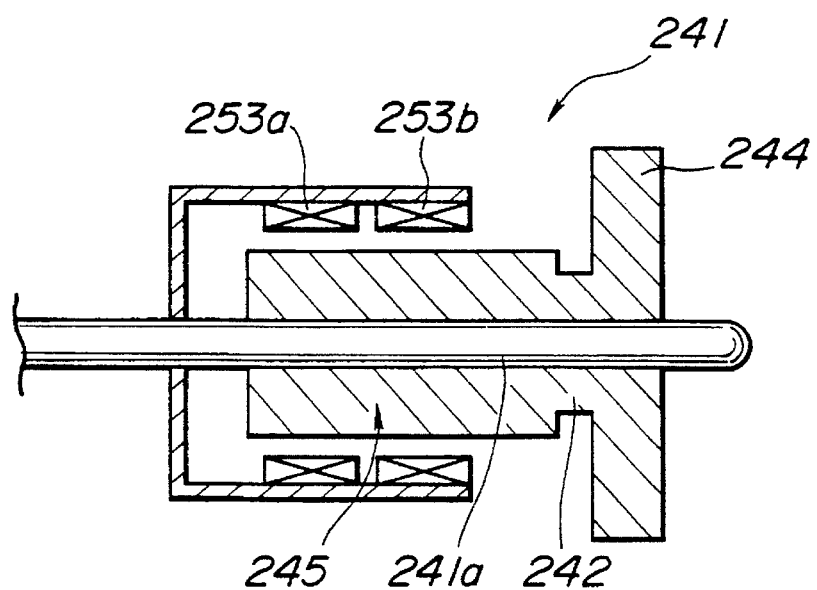
FIG. 23 is a view which schematically shows one example of the gap adjustment structure for the magnet and magnetoresistive effect sensor of a linear feeding system according to a preferred embodiment of the present invention.

FIG. 23 shows the principal part of the stepping motor represented in FIG. 10. Here, the magnet formation method is different.

In the present embodiment, a rotor magnet 245 and a magnet 244 for shift detection are formed together. In other words, the rotor magnet 245 is arranged for coils 53a and 53b with its S-pole and N-pole being magnetized alternately in the circumferential direction. The magnet 244 for shift detection is formed integrally with the rotor magnet 245 which is extended still more through its constricted section 242. The diameter of the magnet 244 for shift detection is made larger than that of the rotor magnet 245. The magnet 244 for shift detection is provided with its S-pole and N-pole being magnetized alternately in the circumferential direction at pitches different from those of the rotor magnet 245.

For the present embodiment, therefore, it is possible to fit both rotor magnet 245 and magnet 244 for shift detection, and fix them to the rotational shaft 241a at a time, hence making the assembling easier. Further, with the provision of the constricted section 242 between the rotor magnet 245 and magnet 244 for shift detection, the different fields of these magnets can hardly affect each other even if its states of magnetization are different.

Figure 24:
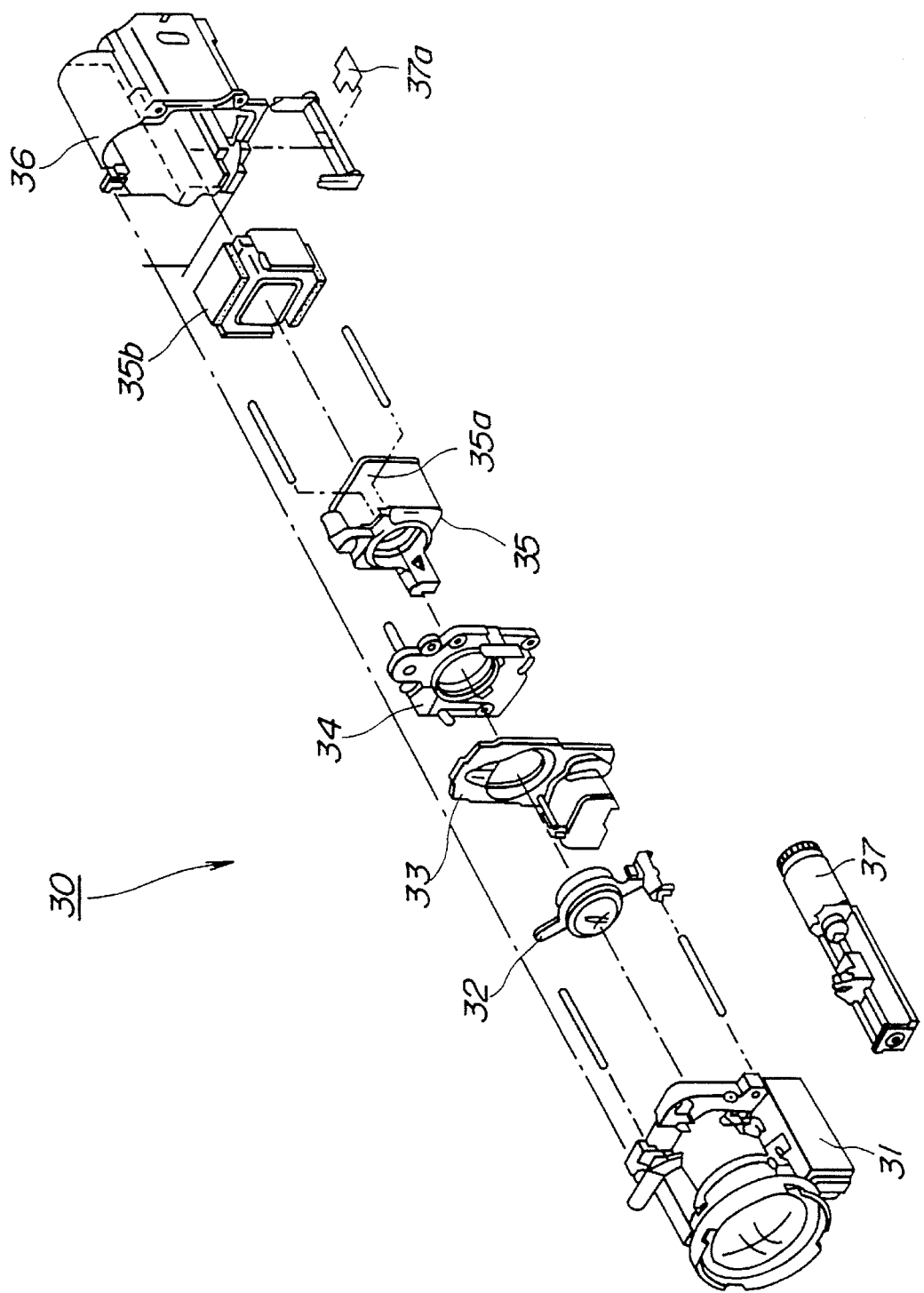
FIG. 24 is an exploded perspective view which shows one example of the zoom lens feeding mechanism for a lens barrel of a video camera in which a linear feeding system embodying the present invention is incorporated.

FIG. 24 is an exploded perspective view which shows a lens barrel used for a video camera in which a linear feeding system of the present embodiment is incorporated as a zoom lens feeding mechanism.

Here, in FIG. 24, the lens barrel 30 for use of a video camera comprises, one after another, an object lens frame 31 for supporting a lens; a second lens frame 32; a diaphragm frame 33, a third lens frame 34; a fourth lens frame 35; and a frame 36 having these lens frames and diaphragm frame being installed.

The object lens frame 31 constitutes a lens group together with the second lens frame 32, diaphragm frame 33, third lens frame 34, and fourth lens frame 35. The fourth lens frame 35 is provided with a moving coil 35a which is inserted into the magnets 35b which are fixedly arranged around it. When this moving coil 35a is energized, these moving coil 35a and the magnets 35b act together to function as a so-called linear motor so as to shift its entire body in the direction of the optical axis.

Also, the second lens frame 32 is movably supported in the direction of optical axis with respect to the object lens frame 31 by a linear feeding system 37 provided with a magnetoresistive effect sensor in the same manner as the linear feeding system represented in FIG. 1 or FIG. 10. In this case, the magnetoresistive effect sensor 37a is fixedly held by the frame 36, and at the same time, the nut member 37a of this linear feeding system 37 is coupled to the second lens frame 32.

In this way, when the diving source of the linear feeding system 37 is energized, the second lens frame 32 is allowed to move correlatively with the object lens 31, the third lens frame 34, and fourth lens frame 35.

In accordance with the lens barrel 30 used for a video camera as described above, the object lens frame 31, second lens frame 32, third lens frame 34, and fourth lens frame 35 are allowed to move integrally in the direction of optical axis to effectuate focusing by energizing the moving coil 35a appropriately. Also, by energizing the driving source of the linear feeding system 37 appropriately, the second lens frame 32 is allowed to move correlatively with the object lens frame 31, third lens frame 34, and fourth lens frame 35 to effectuate zooming.

In a linear feeding system 37 using a DC motor as its source of driving force, for example, it is possible to obtain an output of four pulses per λ from a magnetoresistive effect sensor, provided that the diameter of the DC motor is 10 mmΦ; the diameter of a magnet for use of the magnetoresistive effect sensor is 8 mmΦ; the magnetizing pitch λ is 200 μm; and the pitch of a lead screw is 0.5 mm. Therefore, the positional resolution per pulse can be 1 μm in accordance with the following formula (6):

$$\text{Resolution per pulse} = 500/(8,000 \times \pi/200) = 1 \ \mu m$$

In contrast, if a linear feeding system is adopted using a stepping motor without any magnetoresistive effect sensor as in the conventional art, for example, 20 pulses are output per revolution with the pole numbers being 10. The resolution per pulse is 25 μm. Hence, compared to the conventional use of a stepping motor, it is possible to realize a resolution of as much as 25 times by adopting a linear feeding system in accordance with the present invention. The feeding is executable in a higher precision accordingly.

In this way, the resolution with respect to the movement of the second lens frame 32 is enhanced by approximately one-digit number when a zooming is executed with the adoption of the linear feeding system 37. The focusing performance is also improved accordingly.

Now, in accordance with the embodiments described above, it is possible to detect the rotational direction and speed of the source of driving force in a high precision by arranging the fields of N-pole and S-pole magnetized alternately on the circumference of a cylindrical, column, or disc type magnet installed on the rotational shaft of the driving source so that the magnetic fields act upon the magnetoresistive effect sensor which is provided to face the magnet. This makes it possible to travel the nut member to a desired position in a high precision.

Further, with a simple structure formed just by a magnet installed on the rotational shaft of a driving source; a magnetoresistive effect sensor arranged to face the magnet; and a processor for processing output signals from this magnetoresistive effect sensor, the rotational direction and speed of the rotational shaft can be detected. Therefore, the costs of parts and assembling can be reduced. The structure can also be made smaller at the same time.

Moreover, if the magnetoresistive effect sensor is provided with the pattern which generates the output formed by one cycle of pseudo-sine wave and pseudo-cosine wave, and midpoint potential in one pole width of N-pole or S-pole of the magnet, it becomes possible to easily detect the rotation of driving source by taking difference between the output of the magneto-resistive effect sensor and the midpoint potential.

If the magnetoresistive effect sensor is provided with two patterns which are displaced from each other by ¼ of the one pole width of N-pole or S-pole of the magnet, it is possible to easily discriminate the direction in which the rotational shaft of the driving source rotates.

Further, if there are provided a comparator for comparing the output of the magnetoresistive effect sensor and the midpoint potential, and a controller for detecting the rotational direction and angles of the driving source, it is possible to easily detect the rotation of the driving source, and perform the driving control of the driving source by sensing the pulse edges of the output signals from this comparator.

In a lens barrel used for a video camera having a lens feeding mechanism, it is possible to perform a high-speed lens feed in a high precision at a low cost if the aforesaid linear feeding system is provided as the lens feeding mechanism, In a lens barrel used for a video camera having a zooming lens feeding mechanism and focusing lens feeding mechanism, it is possible to perform a high-speed zooming in a high precision at a low cost if the aforesaid linear feeding system is provided as the zoom lens feeding mechanism.

In this respect, according to the embodiments described above, it may be possible to incorporate a linear feeding system of the kind in a focusing feeding mechanism. Then, the speed and performance of focusing can be improved at a time.

Further, in the embodiment described in FIG. 24, a linear motor is employed as a zooming motor. As a result, compared to the conventional case where a stepping motor is used, it is possible to enhance the speed as much as approximately 10 times if the linear feeding system of the present invention is utilized for zooming.

Also, in the embodiment described above, the description has been made of the case where a linear feeding system of the present invention is applied to the lens barrel 30 for use of a video camera, but the invention is not necessarily limited thereto. It may be possible to adopt the linear feeding system of the present invention as a shaft feeding mechanism of an optical pickup in an optical pickup system having an optical pickup capable of traveling in the radial direction of an optical disc by means of a shaft feeding mechanism. In this case, the optical pickup can perform a high-speed access to a desired position on an optical disc in a high precision. Therefore, the access time can be significantly reduced at a lower cost, while making it possible to make the system smaller.

Moreover, a linear feeding system of the present invention is suitably applicable to the mechanism of printer head feeding. In this case, the traveling of the printer head can be performed at a high speed in a high precision, leading to the enhancement of printing speed and accuracy.

As described above, in accordance with the present invention, it is possible to provide a simply structured small linear feeding system capable of performing a highly precise feeding in a high speed at a low cost.

What is claimed is:

1. A linear feeding system including a driving source, a lead screw integrally formed with a rotational shaft of said driving source, and a nut member threadedly engaged with said lead screw, comprising:

a disc type magnet installed on the rotational shaft of said driving source and having a plurality of N-pole and S-pole alternately magnetized areas in the circumferential direction;

a magnetoresistive effect sensor fixedly arranged to face said magnet, having a patterned structure for generating an output formed by one cycle of pseudo-sine wave and pseudo-cosine wave and a midpoint potential in one N-pole or S-pole width;

a comparator for comparing the pseudo-sine and pseudo-cosine output of said magnetoresistive effect sensor to the midpoint potential; and a controller for controlling a rotational direction and a rotational angle of said driving source in accordance with the output of said comparator.

2. A lens barrel used for a video camera having a zoom lens feeding mechanism and a focus lens feeding mechanism, said zoom lens feeding mechanism provided with a linear feeding system, including a driving source, a lead screw integrally formed with a rotational shaft of said driving source, and a nut member threadedly attached with said lead screw, said linear feeding system comprising:

a disc type magnet installed on the rotational shaft of said driving source and having a plurality of N-pole and S-pole alternately magnetized areas in the circumferential direction;

a magnetoresistive effect sensor fixedly arranged to face said magnet, having a patterned structure for generating an output formed by one cycle of a pseudo-sine wave and a pseudo-cosine wave and a midpoint potential in one N-pole or S-pole width;

a comparator for comparing the pseudo-sine and pseudo-cosine output of said magnetoresistive effect sensor to the midpoint potential; and a controller for controlling a rotational direction and a rotational angle of said driving source in accordance with the output of said comparator.

3. A lens barrel used for a video camera according to claim 2, wherein said driving source is a DC motor.

4. A lens barrel used for a video camera according to claim 2, wherein said driving source is a stepping motor.

* * * * *